US011475797B2

(12) United States Patent
Omata et al.

(10) Patent No.: US 11,475,797 B2
(45) Date of Patent: Oct. 18, 2022

(54) SIMULATED EYEBALL, DEVICE FOR TRAINING IN OPHTHALMIC SURGERY, AND METHOD FOR TRAINING IN OPHTHALMIC SURGERY

(71) Applicant: MITSUI CHEMICALS, INC., Tokyo (JP)

(72) Inventors: Seiji Omata, Aichi (JP); Fumihito Arai, Aichi (JP)

(73) Assignee: MITSUI CHEMICALS, INC., Tokyo (JP)

(*) Notice: Subject to any disclaimer, the term of this patent is extended or adjusted under 35 U.S.C. 154(b) by 289 days.

(21) Appl. No.: 16/607,434

(22) PCT Filed: Nov. 30, 2017

(86) PCT No.: PCT/JP2017/043155
§ 371 (c)(1),
(2) Date: Oct. 23, 2019

(87) PCT Pub. No.: WO2019/106803
PCT Pub. Date: Jun. 6, 2019

(65) Prior Publication Data
US 2020/0135056 A1    Apr. 30, 2020

(51) Int. Cl.
*G09B 23/30* (2006.01)
*G09B 19/24* (2006.01)

(52) U.S. Cl.
CPC ............. *G09B 23/30* (2013.01); *G09B 19/24* (2013.01)

(58) Field of Classification Search
CPC ........ G09B 23/28; G09B 23/39; G09B 23/34; G09B 19/24; G09B 23/30
See application file for complete search history.

(56) References Cited

U.S. PATENT DOCUMENTS

| 4,762,496 A | * | 8/1988 | Maloney | ............... G09B 23/30 434/271 |
| 5,370,641 A | | 12/1994 | O'Donnell, Jr. | |
| 5,868,580 A | * | 2/1999 | Amrein | ................... A61B 3/16 434/271 |
| 5,893,719 A | * | 4/1999 | Radow | ................... G09B 23/28 434/271 |

(Continued)

FOREIGN PATENT DOCUMENTS

| CN | 105551358 A | 5/2016 |
| EP | 1193664 A2 | 4/2002 |

(Continued)

OTHER PUBLICATIONS

Supplemental European Search Report issued in corresponding European Application No. EP17933674.8, dated Aug. 10, 2020.

(Continued)

*Primary Examiner* — Robert J Utama
*Assistant Examiner* — Correll T French
(74) *Attorney, Agent, or Firm* — McDermott Will & Emery LLP

(57) ABSTRACT

A simulated eyeball for training in ophthalmic surgery includes a simulated sclera region that constitutes a simulated sclera, and a conductor layer that is formed on a side of the simulated sclera region that is on an interior of the simulated eyeball, the conductor layer forming a simulated choroid region.

20 Claims, 12 Drawing Sheets

(56) References Cited

U.S. PATENT DOCUMENTS

| | | | | |
|---|---|---|---|---|
| 6,146,892 A * | 11/2000 | Ma | ................... | A61L 27/18 264/45.6 |
| 6,589,057 B1 * | 7/2003 | Keenan | ................... | G09B 23/30 434/271 |
| 9,437,119 B1 * | 9/2016 | Bernal | ................... | G09B 23/34 |
| 10,360,819 B2 * | 7/2019 | Huh | ................... | G09B 23/32 |
| 2002/0028429 A1 * | 3/2002 | Umeyama | ................... | G09B 23/30 434/271 |
| 2003/0068606 A1 * | 4/2003 | Nicholls | ................... | G09B 23/34 434/262 |
| 2006/0173077 A1 | 8/2006 | Cagle | | |
| 2007/0142749 A1 * | 6/2007 | Khatib | ................... | A61B 5/061 600/587 |
| 2009/0004636 A1 * | 1/2009 | Garda | ................... | G09B 23/30 434/271 |
| 2009/0004637 A1 * | 1/2009 | Carda | ................... | G09B 23/30 434/271 |
| 2009/0068627 A1 * | 3/2009 | Toly | ................... | G09B 23/28 434/267 |
| 2009/0291423 A1 * | 11/2009 | Hara | ................... | G09B 23/34 434/271 |
| 2011/0181836 A1 * | 7/2011 | Rowe | ................... | A61B 3/102 351/205 |
| 2012/0021397 A1 * | 1/2012 | Van Dalen | ................... | G09B 23/30 434/271 |
| 2012/0034587 A1 * | 2/2012 | Toly | ................... | G09B 23/285 434/267 |
| 2012/0231432 A1 * | 9/2012 | Van Dalen | ................... | G09B 23/30 434/271 |
| 2013/0030524 A1 * | 1/2013 | Akura | ................... | G09B 23/34 623/6.13 |
| 2014/0272870 A1 * | 9/2014 | Eichhorn | ................... | G09B 23/30 434/267 |
| 2014/0341965 A1 * | 11/2014 | Golestaneh | ................... | A61L 27/58 424/426 |
| 2016/0063898 A1 * | 3/2016 | Bernal | ................... | G09B 23/32 434/271 |
| 2016/0086517 A1 * | 3/2016 | Gao | ................... | G09B 23/34 434/271 |
| 2016/0372011 A1 * | 12/2016 | Bernal | ................... | G09B 23/34 |
| 2017/0018206 A1 * | 1/2017 | Hofstetter | ................... | G09B 23/34 |
| 2017/0134668 A1 * | 5/2017 | Riedel | ................... | G09B 23/30 |
| 2019/0051216 A1 * | 2/2019 | Bernal | ................... | A61F 9/00736 |
| 2019/0244543 A1 * | 8/2019 | Turk | ................... | G09B 23/28 |
| 2019/0325785 A1 * | 10/2019 | Huang | ................... | G06T 19/006 |

FOREIGN PATENT DOCUMENTS

| | | | |
|---|---|---|---|
| JP | 2007-127708 A | 5/2007 | |
| WO | WO-2010084595 A1 * | 7/2010 | ............. G09B 23/34 |
| WO | 2011/125136 A1 | 10/2011 | |

OTHER PUBLICATIONS

International Search Report and Written Opinion of the International Searching Authority issued in International Application No. PCT/JP2017/043155, dated Jun. 26, 2018, with partial translation of cited references and explanations.

Hisataka Maruyama et al., "Fabrication of retina model having photoelastic pressure sensor for vitreoretinal surgery simulator," IEEE Conference Proceedings, Jul. 27, 2017, pp. 391-392 (cited in ISR).

International Preliminary Report on Patentability, issued in International Application No. PCT/JP2017/043155, dated Feb. 13, 2018, with partial translation of cited references and explanations.

* cited by examiner

Byte 1: 19, Byte 2: 226, Pressure: 26.3350620269 mbar, 2633.5061035156 Pa, 19.7529296875 mmHg
POWER: 239
Byte 1: 19, Byte 2: 232, Pressure: 26.3808364868 mbar, 2638.0837402343 Pa, 19.7872619628 mmHg
POWER: 240
Byte 1: 20, Byte 2: 24, Pressure: 26.7470245361 mbar, 2674.7023925781 Pa, 20.0619258880 mmHg
POWER: 239
Byte 1: 20, Byte 2: 38, Pressure: 26.8538303375 mbar, 2685.3830566406 Pa, 20.1420364379 mmHg
POWER: 238
Byte 1: 20, Byte 2: 3, Pressure: 26.5868167877 mbar, 2658.6816406250 Pa, 19.9417610168 mmHg
POWER: 239
Byte 1: 19, Byte 2: 244, Pressure: 26.4723834991 mbar, 2647.2382812500 Pa, 19.8559284210 mmHg
POWER: 240
Byte 1: 20, Byte 2: 1, Pressure: 26.5715599060 mbar, 2657.1560058593 Pa, 19.9303169250 mmHg
POWER: 241
Byte 1: 19, Byte 2: 248, Pressure: 26.5028991699 mbar, 2650.2900390625 Pa, 19.8788166046 mmHg
POWER: 242

SIMULATED EYEBALL, DEVICE FOR TRAINING IN OPHTHALMIC SURGERY, AND METHOD FOR TRAINING IN OPHTHALMIC SURGERY

CROSS-REFERENCE OF RELATED APPLICATION

This application is the U.S. National Phase under 35 U.S.C. § 371 of International Patent Application No. PCT/JP2017/043155, filed on Nov. 30, 2017, the entire disclosure of which Application is incorporated by reference herein.

BACKGROUND OF THE INVENTION

Field of the Invention

The present disclosure relates to a simulated eyeball, a device for training in ophthalmic surgery, and a method for training in ophthalmic surgery.

Description of the Related Art

Numbers of ophthalmic surgery cases in Japan are said to be approximately 2,000,000 for cataract, 200,000 for glaucoma, and 20,000 for vitreoretinal surgery. Because ophthalmic surgery targets the extremely delicate tissue of the eye, proficiency in ophthalmic surgery requires a large amount of experience. However, because medical errors in surgery performed by less experienced physicians can lead to medical lawsuits, it is difficult for less experienced physicians to acquire surgical experience in a clinical setting. As a solution to this problem, a device for training in ophthalmic surgery is known whereby surgical training with a sensation close to that of human ophthalmic surgery is possible using a simulated eyeball, so that a physician can acquire a large amount of experience that approximates surgery extremely closely.

A simulated eye device for training in cataract surgery is known as an example of a device for training in ophthalmic surgery (see Patent Document 1). The simulated eye device described in Patent Document 1 is disclosed as being provided with a simulated nucleus corresponding to the lens nucleus of a human eye, and a simulated cortex corresponding to the lens cortex of a human eye. Patent Document 1 also discloses that by incorporating a magnet into a simulated eye and embedding an iron ball as a magnetic body in a pedestal, the simulated eye is able to move centered about a point of contact of the magnet and the magnetic body.

As another device for training in ophthalmic surgery, a device is also known in which a simulated eyeball is pressed against a face model by spring force of a wire, the device using a simulated eyeball in which an epiretinal membrane (ERM) as an object for vitreoretinal surgery and an inner limiting membrane (ILM) are layered on a bottom surface part of an intraocular space (see Patent Document 2).

A device for training in ophthalmic surgery is also known in which numerous screws are insertable into a housing interior from outside the housing, and a position of a simulated eyeball disposed in the housing can thereby be adjusted (see Patent Document 3).

[Patent Document 1] PCT International Publication No. WO 2011/125136

[Patent Document 2] Specification of US Patent Application Publication No. 2012/0021397

[Patent Document 3] Specification of US Patent Application Publication No. 2016/0063898

SUMMARY OF THE INVENTION

Among various types of ophthalmic surgery, the main procedures in surgery for glaucoma are (1) trabeculectomy for making a bypass between the inside of the eye and the bottom of the conjunctiva and causing intraocular fluid to drain into a pool created beneath the conjunctiva, and (2) trabeculotomy for making an incision in tissue of a drain tube in the eye to improve the efficiency of intraocular drainage. Both procedures require thinly slicing the sclera, which corresponds to the white of the eye. FIG. 1 is a schematic diagram designed to illustrate thinly slicing the sclera, and shows a state where a sclera region b that is adjacent to a cornea region a has a portion, close to the cornea region a, where a thin slice (b1) is made by a surgical knife c. However, simulated eyeballs disclosed in Patent Literature 1 to 3 were mainly contrived in view of training for cataracts. Therefore, conventional simulated eyeballs present a problem by not having a contrivance required for training in thinly slicing the sclera and by not being able to be used for training in glaucoma surgery.

The present disclosure was contrived to solve the problem described above. As a result of thoroughgoing investigations, it was newly discovered that forming a simulated sclera region in a simulated eyeball and employing a configuration required for training in glaucoma surgery makes it possible to provide a simulated eyeball suitable for training in glaucoma surgery.

Specifically, an object of the present disclosure is to provide a simulated eyeball that can be used for training in ophthalmic surgery, a device for training in ophthalmic surgery, and a method for training in ophthalmic surgery.

The present disclosure pertains to a simulated eyeball, a device for training in ophthalmic surgery, and a method for training in ophthalmic surgery, which are described below.

[1] A simulated eyeball for training in ophthalmic surgery, the simulated eyeball comprising:
a simulated sclera region that constitutes a simulated sclera; and
a conductor layer formed on a side of the simulated sclera region that is on an interior of the simulated eyeball;
the conductor layer forming a simulated choroid region.

[2] The simulated eyeball of [1] above, wherein:
the simulated eyeball includes a simulated cornea region that constitutes a simulated cornea,
the conductor layer includes an extension region that extends away from the simulated sclera into the simulated eyeball, at a position near a boundary between the simulated cornea region and the simulated sclera region, and
the extension region forms a simulated iris region.

[3] The simulated eyeball of [1] or [2] above, wherein:
a recess is formed on the simulated sclera near the simulated cornea region, the recess being formed on the conductor-layer side of the simulated sclera; and
the recess forms a simulated Schlemm's canal.

[4] The simulated eyeball of any of [1]-[3] above, wherein:
the simulated sclera includes fibers having a diameter of 50-500 nm.

[5] The simulated eyeball of [4] above, wherein the simulated sclera comprises:
a simulated sclera resin layer; and
a fiber layer that is layered on the simulated sclera resin layer.

[6] The simulated eyeball of [4] above, wherein the simulated sclera comprises:
a cloth formed from the fibers; and
a resin with which the cloth is impregnated.

[7] The simulated eyeball of [6] above, wherein:
at least two cloths are layered.

[8] The simulated eyeball of any of [1]-[7] above, wherein:
an interior of the simulated eyeball is formed in a hollow sealed shape, and the hollow portion can be filled with a fluid; and
a pressure sensor that detects a pressure of the fluid that fills the hollow portion is formed inside or outside the simulated eyeball.

[9] A device for training in ophthalmic surgery, the device comprising:
the simulated eyeball of any of [1]-[8] above;
an ophthalmic surgery instrument of which at least a tip part is formed from an electroconductive material; and
a sensing device for sensing that the tip part of the ophthalmic surgery instrument has come into contact with the conductor layer of the simulated eyeball.

[10] A method for training in ophthalmic surgery in which a simulated eyeball and an ophthalmic surgery instrument are used, wherein:
the simulated eyeball comprises
a simulated sclera region, and
a conductor layer formed on a side of the simulated sclera region that is on an interior of the simulated eyeball;
a tip part of the ophthalmic surgery instrument is formed from an electroconductive material;
the ophthalmic surgery instrument includes at least a surgical knife; the training method comprising at least:
an incision step in which an incision is made in a simulated sclera using the surgical knife; and
a sensing step for sensing whether an edge of the surgical knife and the conductor layer have come into contact during the incision step.

[11] A simulated eyeball for training in ophthalmic surgery, wherein:
the simulated eyeball includes a simulated sclera, and
the simulated sclera includes fibers having a diameter of 50-500 nm.

[12] The simulated eyeball of [11] above, wherein the simulated sclera comprises:
a resin layer; and
a fiber layer that is layered on the resin layer.

[13] The simulated sclera of [11] above, wherein the simulated sclera comprises:
a cloth formed from the fibers; and
a resin with which the cloth is impregnated.

[14] The simulated sclera of [13] above, wherein:
at least two cloths are layered.

[15] A simulated eyeball for training in ophthalmic surgery, wherein:
the simulated eyeball
has a simulated sclera region, and
is formed such that an interior of the simulated eyeball has a hollow sealed shape, and such that the hollow portion can be filled with a fluid; and
a pressure sensor that detects a pressure of the fluid that fills the hollow portion is formed inside the simulated eyeball or outside the simulated eyeball.

The simulated eyeball, the device for training in ophthalmic surgery, and the method for training in ophthalmic surgery disclosed in the present application make it possible to train in thinly slicing the sclera.

BRIEF DESCRIPTION OF THE DRAWINGS

FIG. 14A is a photograph of a simulated eyeball created in example 1, and FIG. 14B is a photograph of a device for training in ophthalmic surgery when conduction has been confirmed;

FIG. 15A is a photograph of a simulated eyeball created in example 3, FIG. 15B is a SEM photograph of a fiber layer, and FIG. 15C is a photograph when a simulated sclera (fiber layer) has been thinly sliced;

FIG. 16A is a photograph of a simulated eyeball created in example 5, and FIG. 16B is a photograph after the simulated eyeball has been filled with a fluid using a pump.

DESCRIPTION OF THE PREFERRED EMBODIMENTS

A simulated eyeball, a device for training in ophthalmic surgery, and a method for training in ophthalmic surgery according to embodiments will be described in detail below with reference to the drawings. Members that have the same type of function are referred to by the same or similar reference symbols in the present specification. Repeated

First Embodiment

Figure 1:
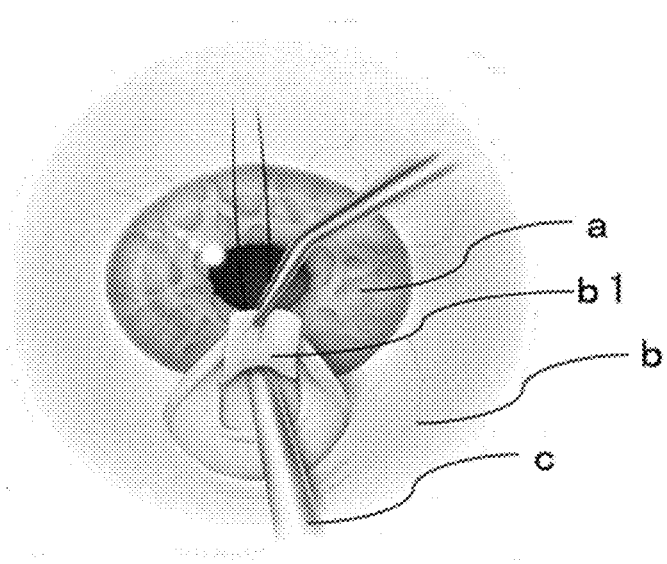
FIG. 1 is a schematic diagram designed to illustrate thinly slicing a sclera.
Figure 2A:
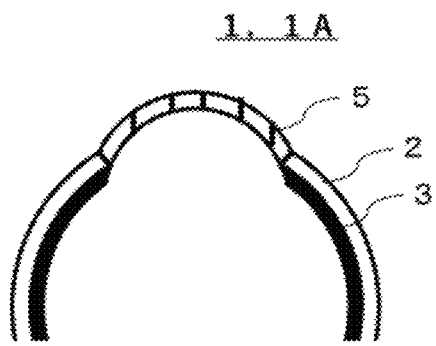
FIGS. 2A and 2B are schematic cross-sectional diagrams showing parts of a simulated eyeball in a first embodiment.
Figure 2B:
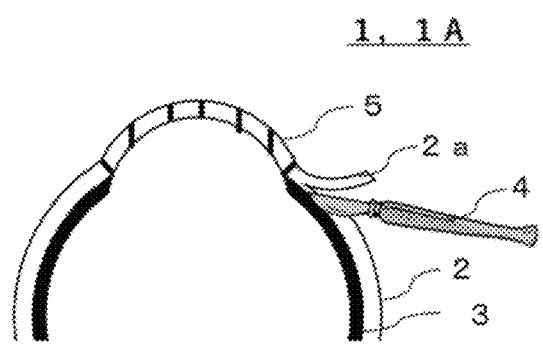

A simulated eyeball 1A in a first embodiment will be described with reference to FIGS. 2A and 2B. FIGS. 2A and 2B are schematic cross-sectional diagrams showing parts of the simulated eyeball in the first embodiment. Descriptions that are common to both FIGS. 2A and 2B sometimes refer to "FIG. 2" in the specification. The same applies for the other drawings.

The simulated eyeball 1A in the first embodiment has at least a simulated sclera region 2, and a conductor layer 3 formed on a side of the simulated sclera region 2 that is on an interior of the simulated eyeball. In the present description, the "simulated sclera region" refers to a "region" in which a "simulated sclera" is formed. Therefore, this element is described as the "simulated sclera" in cases illustrating the characteristics or the like of the "simulated sclera" and as the "simulated sclera region" in cases illustrating the region in which the "simulated sclera" is provided. The same reference symbol is applied to both the "simulated sclera" and the "simulated sclera region". Distinctions between a "simulated cornea" and a "simulated cornea region," and between a "simulated choroid" and a "simulated choroid region," are the same as that between the "simulated sclera" and the "simulated sclera region".

In thinly slicing a sclera during actual glaucoma surgery, there may be cases where the sclera is cut too deeply and an edge of a surgical knife 4 reaches a choroid underneath the sclera if the surgery is performed by an inexperienced doctor. Nerves are densely clustered in the choroid, presenting a problem in that a patient will feel pain if the edge of the surgical knife 4 comes in contact with the choroid. Therefore, when thinly slicing an actual sclera, it is necessary to thinly slice the sclera in a manner such that the edge of the surgical knife 4 does not reach the choroid. In the simulated eyeball 1A in the first embodiment, the conductor layer (simulated choroid) 3 is formed on the side of the simulated sclera region 2 that is on the interior of the simulated eyeball. Therefore, when the edge of the surgical knife 4 reaches the conductor layer 3 as shown in FIG. 2B, a circuit is formed due to the surgical knife 4 contacting the conductor layer 3, making it possible to sense that the surgical knife 4 has penetrated through the simulated sclera 2. Therefore, when the simulated eyeball 1A of the first embodiment is used, it is possible to sense whether the edge of the surgical knife 4 has penetrated through the simulated sclera 2 when training to create a thin slice 2a by thinly slicing the simulated sclera region 2 using the surgical knife 4.

A material forming the simulated sclera 2 is not particularly limited as long as the material can be thinly sliced by the edge of the surgical knife 4. In the first embodiment, examples include: polymer materials selected from the group consisting of vinyl-based polymers such as polyvinylidene chloride, polyvinyl chloride, and polyvinyl alcohol, polyolefins such as polyethylene, polypropylene, and polymethyl pentene, polyesters such as polyethylene terephthalate, polyamides, cellophane and other cellulose-based polymers, and combinations of these; and polymer materials selected from the group consisting of rubbers (elastomers), e.g., silicone rubbers such as polydimethylsiloxane (PDMS), butadiene rubbers, isoprene rubbers, butyl rubbers, fluorine rubbers, ethylene propylene rubbers, nitrile rubbers, natural rubbers, polyurethane rubbers, and combinations of these.

A material for forming the conductor layer 3 is not particularly limited as long as the material is electrically conductive. Examples of a method for creating the conductor layer 3 include:

forming a film (conductor layer 3) by blowing, on an inner side of the simulated sclera region 2 by spraying or the like, a solution that includes electroconductive metal microparticles composed of gold, silver, copper, aluminum, tin, magnesium, chromium, nickel, zirconium, iron, or the like, or that includes an electroconductive material such as carbon fibers, carbon nanotubes, or graphite, or that includes an oligothiophene derivative, tetracene, or an organic semiconductor material based on polythiophene, polyacetylene, polyaniline, polypyrrole, or the like;

forming a film (conductor layer 3) composed of an electroconductive metal material on the inner side of the simulated sclera region 2 by sputtering or the like; and forming a film (conductor layer 3) by blowing a well-known electroconductive polymer on the inner side of the simulated sclera region 2 by spraying or the like.

The methods listed above involve forming a film-form conductor layer 3 by, inter alia, directly spraying an electroconductive material on the inner side of the simulated sclera region 2, but other methods may be employed. Examples of other methods include:

creating the conductor layer 3 by using a mold created by a 3D printer or the like first to form a non-electroconductive base material for constituting the conductor layer 3, and then to form a film of the above-described electroconductive metal microparticles, electroconductive material, electroconductive polymer, or the like on the non-electroconductive base material by dip coating or the like;

creating a conductor layer 3 that includes an electroconductive material in an interior thereof by dispersing electroconductive metal microparticles, an electroconductive material, an electroconductive polymer, or the like in a material for forming the above-described non-electroconductive base material and then curing the base material using a mold; and creating an electroconductive base material (conductor layer 3) by curing an electroconductive polymer using a mold.

Examples of the material for forming the non-electroconductive base material include the materials forming the simulated sclera region 2.

Figure 3A:
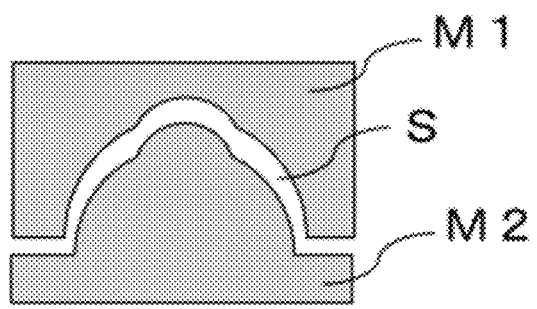
FIGS. 3A and 3B are cross-sectional diagrams showing one example of a method for manufacturing a simulated eyeball 1A of the first embodiment.
Figure 3B:
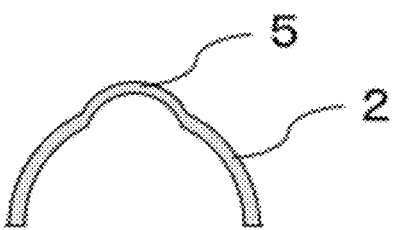

FIGS. 3A and 3B are cross-sectional diagrams showing one example of a method for manufacturing the simulated eyeball 1A of the first embodiment. First, as shown in FIG. 3A, molds M1 and M2 for forming the simulated sclera region 2 (and a simulated cornea region 5, as necessary) are created using a 3D printer or the like. The material for constituting the simulated sclera 2 is then poured into a space S between the molds M1 and M2 shown in FIG. 3A and is cured. After the material is cured, the molds are then peeled away to form the simulated sclera 2. The simulated eyeball 1A of the first embodiment shown in FIG. 2A can be created by, inter alia, spraying the material for forming the conductor layer 3 on the inner side of the simulated sclera region 2. The conductor layer 3 may be formed on the entire region on the inner side of the simulated sclera region 2 or on only a portion thereof. When only a partial formation is implemented, it is preferable to provide a region for forming a circuit at least with the inner side of the simulated sclera region in which an incision is to be made by the surgical knife, and with a sensing device as necessary. In the manufacturing method shown in FIG. 3A, the simulated cornea region 5 can also be manufactured at the same time. Therefore, the simulated cornea 5 may be formed from the same material as the simulated sclera 2.

The simulated cornea 5 may also be formed from a different material than the simulated sclera 2. Specifically, the molds shown in FIG. 3A are turned upside-down, a material in an amount that enables formation of the simulated cornea region 5 is first injected into the mold M1, and then the mold M2 is inserted and a material for constituting the simulated cornea region 5 is cured. The simulated sclera region 2 and the simulated cornea region 5 then can be integrally molded from different materials by pouring a material different from the simulated cornea region 5 into the space S between the molds M1 and M2 and curing. When creating a simulated eyeball 1A that is specialized for thinly slicing the simulated sclera 2 and does not require the simulated cornea region 5, the simulated eyeball 1A not including the simulated cornea region 5 can be created by changing the shapes of the molds M1 and M2.

A thickness of a simulated sclera of a human eyeball is about 0.1-1 mm. Therefore, the molds are preferably designed so that a thickness of the simulated sclera 2 is also about 0.1-1 mm. For a simulated sclera 2 provided with a fiber layer (described below), a configuration is preferred in which the thickness of the simulated sclera 2 including the fiber layer is about 0.1-1 mm. A simulated sclera provided with a fiber layer (described below) can reproduce a sensation of severing fibers using a surgical knife. Therefore, when using a simulated eyeball for the purpose of conducted repeated training that involves thin slicing, i.e., not for the purpose of obtaining thin slices so that the edge portion of the surgical knife does not reach the choroid, but rather for the purpose of conducting repeated training that involves thin slicing, the thickness is not limited to about 0.1-1 mm, but rather may be designed to be greater than the sclera of the human eyeball, e.g., 2 mm, 3 mm, or 4 mm.

Second Embodiment

Figure 4A:
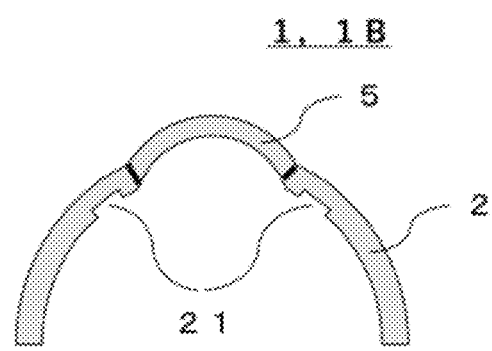
FIGS. 4A to 4C are cross-sectional diagrams showing schematics of a simulated eyeball 1B of a second embodiment.

FIG. 4A is a cross-sectional diagram showing a schematic of a simulated eyeball 1B of a second embodiment. In the simulated eyeball 1B of the second embodiment, a recess 21 is formed on the simulated sclera 2 near the simulated cornea region 5, the recess 21 being formed on the inner side of the simulated sclera 2 (the side on which the conductor layer 3 is layered). The recess 21 can be used as a simulated Schlemm's canal.

Within a human eyeball, there is a venous system having a lumenal structure that is referred to as "Schlemm's canal" and that functions to discharge the fluid from inside the eye. In the trabeculotomy type of glaucoma surgery, after the sclera is thinly sliced, it is necessary to insert a narrow metal rod having a diameter of about 0.5 mm into Schlemm's canal and cut out a fiber cylinder. However, in conventional simulated eyeballs, no lumenal structure simulating Schlemm's canal is provided whatsoever, and it is impossible to conduct training in making an incision in the fiber cylinder. In the simulated eyeball 1B of the second embodiment, a simulated Schlemm's canal is formed by providing the recess 21 in the simulated sclera 2, and therefore it is possible to also conduct training in inserting the narrow metal rod into the simulated Schlemm's canal after thinly slicing the simulated sclera 2.

Figure 4B:
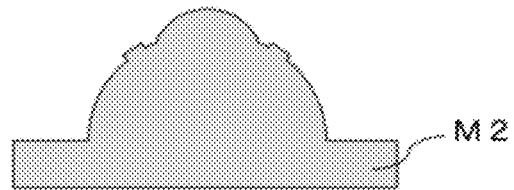
Figure 4C:
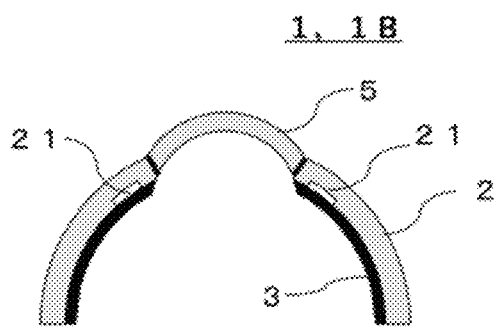

It is preferable to use a mold M2 provided with a protrusion for forming the recess 21, as shown in FIG. 4B. If the conductor layer 3 is formed by spraying or the like when the recess 21 is formed in the simulated sclera 2, the conductor layer 3 will be formed along a shape of the recess 21. Therefore, it is preferable to use a conductor layer 3 created by first forming a base material for constituting the conductor layer 3 using a mold created by a 3D printer or the like and then forming a film of the above-described electroconductive material on the base material, and to thereby achieve a configuration in which the conductor layer 3 is not formed inside the recess 21, as shown in FIG. 4C (this is described in more detail below).

Figure 5A:
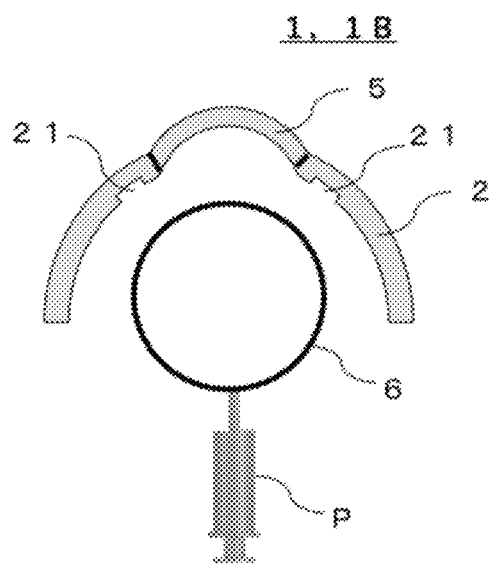
FIGS. 5A and 5B are cross-sectional diagrams showing schematics of another method for creating the simulated eyeball 1B of the second embodiment.
Figure 5B:
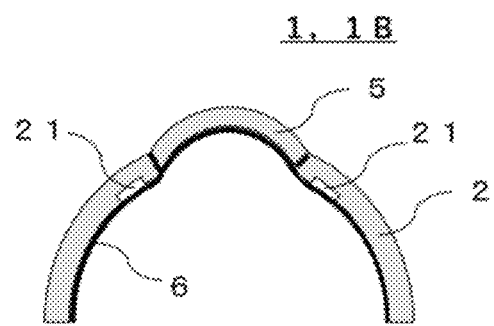

FIGS. 5A and 5B are cross-sectional diagrams showing schematics of another method for creating the simulated eyeball 1B of the second embodiment. First, as shown in FIG. 5A, a resin 6 is extruded in the manner of a soap bubble using a device P for extrusion such as a syringe. The extruded resin 6 forms a layer of the resin 6 that adheres to the inner side of the simulated sclera 2, as shown in FIG. 5B. At this time, due to surface tension, the resin 6 does not enter into the recess 21. Therefore, the amount of space in the recess 21 can be maintained. Examples of the resin 6 include water-soluble resins such as polyvinyl alcohol (PVA) and polyethylene glycol. Alternative examples include: polymer materials selected from the group consisting of vinyl-based polymers such as polyvinylidene chloride, polyvinyl chloride, and polyvinyl alcohol, polyolefins such as polyethylene, polypropylene, and polymethyl pentene, polyesters such as polyethylene terephthalate, polyamides, cellophane and other cellulose-based polymers, and combinations of these; and polymer materials selected from the group consisting of rubbers (elastomers), e.g., silicone rubbers such as polydimethylsiloxane (PDMS), butadiene rubbers, isoprene rubbers, butyl rubbers, fluorine rubbers, ethylene propylene rubbers, nitrile rubbers, natural rubbers, polyurethane rubbers, and combinations of these. After the resin 6 is formed, the simulated eyeball 1B of the second embodiment can be created by spraying the electroconductive material on an inner side of the resin 6, or by providing the base material on which the film is formed from the electroconductive material.

Third Embodiment

Figure 6A:
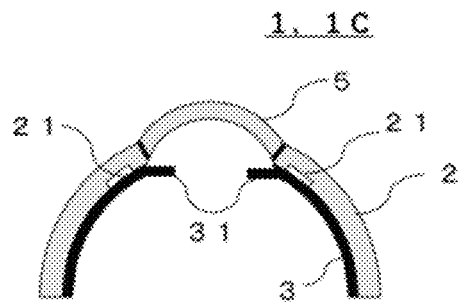
FIG. 6A is a cross-sectional diagram showing a schematic of a simulated eyeball 1C of a third embodiment.

FIG. 6A is a cross-sectional diagram showing a schematic of a simulated eyeball 1C of a third embodiment. The simulated eyeball 1C of the third embodiment includes an extension region 31 by which the conductor layer 3 extends away from the simulated sclera 2 into the simulated eyeball 1C, from a position near a boundary between the simulated cornea region 5 and the simulated sclera region 2. The extension region 31 forms a simulated iris region 31. When the simulated eyeball 1C of the third embodiment is used, an iris region of the eyeball is formed by the conductor layer 3. Therefore, in addition to training in glaucoma surgery, in procedures such as making an incision in a fiber cylinder, it is possible to perform surgery so that the metal rod does not mistakenly touch the iris during making of an incision in the fiber cylinder. Alternative uses involve performing training for micro-glaucoma surgery that involves inserting an instrument such as an iStent, a trabectome, a hydrus microstent, a GAT, a CyPass microstent, or a XEN into the eyeball so that the instrument does not touch the iris from the corneal ring.

Figure 6B:
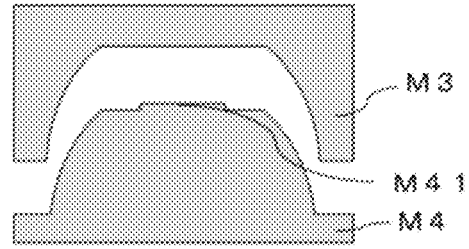
FIGS. 6B to 6D are cross-sectional diagrams showing schematics of a method for manufacturing a conductor layer 3 in which a base material is used.
Figure 6C:
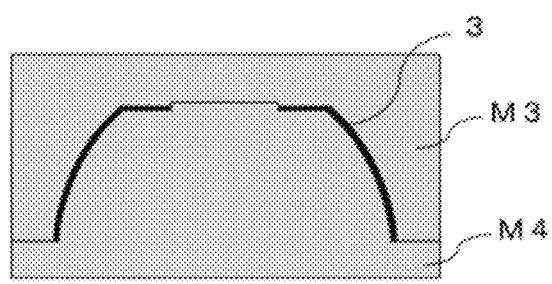
Figure 6D:
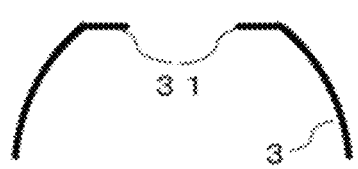

The extension region 31 of the conductor layer 3 of the simulated eyeball 1C must be held at a position set apart from the simulated sclera 2 within the simulated eyeball 1C. Therefore, the conductor layer 3 and the extension region 31 must be created using the base material rather than the film formed by spraying or the like. FIGS. 6B to 6D are cross-sectional diagrams showing schematics of a method for manufacturing the conductor layer 3 in which the base material is used. First, as shown in FIG. 6B, a mold M3 and a mold M4 that has a protrusion M41 for forming the extension region 31 are created using a 3D printer or the like. In the case of the simulated eyeballs 1A, 1B of the first and second embodiments, it is preferable to use a mold M4 that lacks the protrusion M41. It is preferable to next fill a space between the molds M3 and M4 with the material that forms the non-electroconductive base material described in the first embodiment, to cure the material, and to form the film from the electroconductive material. Alternatively, the conductor layer 3 having the extension region 31 as shown in FIG. 6D can be created by filling/curing a base material in which an electroconductive material is dispersed or by filling/curing an electroconductive polymer.

Fourth Embodiment

Figure 7A:
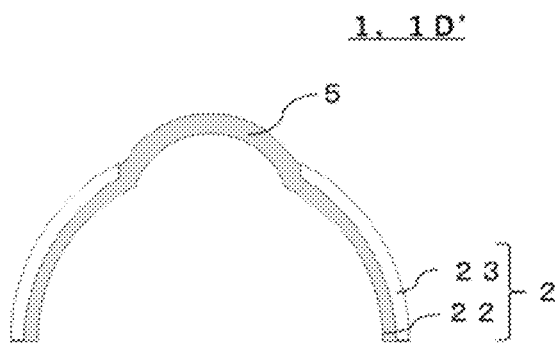
FIGS. 7A and 7B are cross-sectional diagrams showing schematics of a simulated eyeball 1D of a fourth embodiment.
Figure 7B:
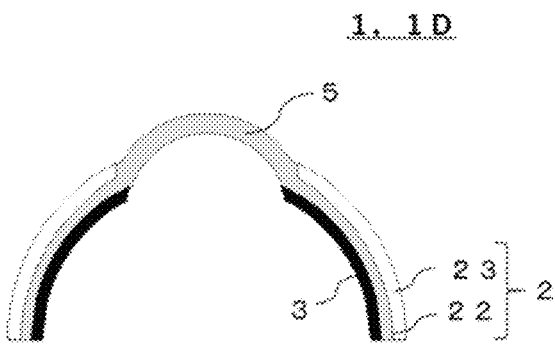

FIGS. 7A and 7B are cross-sectional diagrams showing schematics of a simulated eyeball 1D of a fourth embodiment. In the simulated eyeball 1D of the fourth embodiment, the simulated sclera 2 includes fibers having a diameter of 50-500 nm. More specifically, as shown in FIG. 7A, the simulated sclera 2 includes a simulated sclera resin layer 22, and a fiber layer 23 that is layered on the simulated sclera resin layer 22.

The simulated sclera resin layer 22 of the simulated eyeball 1D is used as a foundation for layering of the fiber layer 23. It is preferable to use the same material for a material that forms the simulated sclera resin layer 22 as was used for the material that forms the simulated sclera region 2 of the simulated eyeball 1A of the first embodiment. Molds are preferably used in the process in the same manner as with the simulated sclera 2 of the simulated eyeball 1A of the first embodiment. More specifically, the fiber layer 23 may be layered on the simulated sclera region 2 of the simulated eyeball 1A of the first embodiment.

Figure 8:
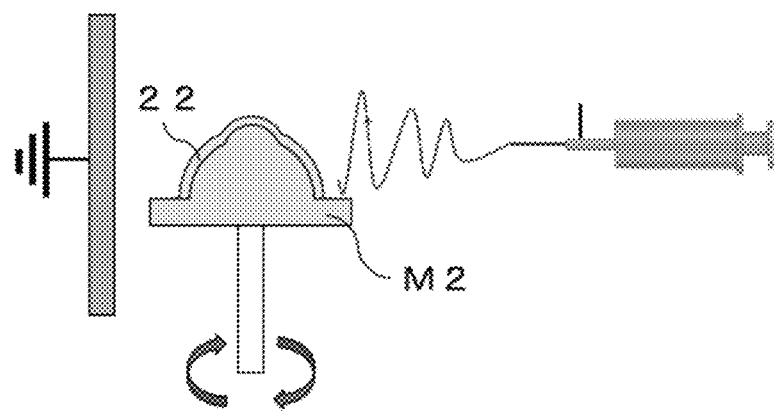
FIG. 8 is a schematic cross-sectional diagram showing a method for creating a fiber layer 23 of the simulated eyeball 1D of the fourth embodiment.

FIG. 8 is a schematic cross-sectional diagram showing a method for creating the fiber layer 23 of the simulated eyeball 1D of the fourth embodiment. In the embodiment shown in FIG. 8, the fiber layer 23 is formed by layering fibers through electrospinning while rotating the mold M2 in a state where the simulated sclera resin layer 22 is placed on the mold M2. Electrospinning is a method that involves applying a high voltage to a solution in which a raw material for forming the fiber layer 23 is dissolved, whereupon the charged solution separates, a solvent evaporates, and nanofibers accumulate on a grounded target.

The raw material for forming the fiber layer 23 is not particularly limited as long as a liquid can be formed by dissolving the raw material in a solvent. Examples include: polyolefin-based polymers such as polyethylene and polypropylene; polystyrenes; polyimides, polyamides, and polyamide-imides; polyarylenes (aromatic polymers) such as polyparaphenylene oxide, poly(2,6-dimethylphenylene oxide), and polyparaphenylene sulfide; substances obtained by introducing a sulfonic acid group (—SO$_3$H), a carboxyl group (—COOH), a phosphoric acid group, a sulfonium group, an ammonium group, or a pyridinium group into a polyolefin-based polymer, a polystyrene, a polyimide, or a polyarylene (aromatic polymer); fluorine-containing polymers such as polytetrafluoroethylene and polyvinylidene fluoride; perfluorosulfonic acid polymers, perfluorocarboxylic acid polymers, and perfluorophosphonic acid polymers in which a sulfonic acid group, a carboxyl group, or a phosphoric acid group is introduced into a skeleton of a fluorine-containing polymer; polybutadiene-based compounds; polyurethane-based compounds such as elastomers and gels; silicone-based compounds; polyvinyl chloride; polyethylene terephthalate; nylon; and polyarylates. These raw materials may be used alone or in a combination of a plurality of raw materials, and may be functionalized, and may be configured as a copolymer in which two or more monomers that constitute these raw materials are combined.

The solvent may be selected as appropriate from among solvents capable of dissolving the raw material. Examples include methanol, ethanol, isopropanol, butanol, benzyl alcohol, acetone, methylethylketone, cyclohexanone, methyl acetate, ethyl acetate, propyl acetate, butyl acetate, methyl formate, ethyl formate, hexane, cyclohexane, dichloromethane, chloroform, carbon tetrachloride, benzene, toluene, xylene, dimethylformamide, N-methylpyrrolidone (NMP), diethyl ether, dioxane, tetrahydrofuran, and 1-methoxy-2-propanol.

A diameter of fibers for forming the fiber layer 23 is preferably 50-500 nm, more preferably 80-400 nm, and particularly preferably 100-300 nm. The fiber diameter can be adjusted by means of, inter alia, a size of a nozzle that ejects a raw-material solution or a voltage that is applied. The fiber layer 23 may be formed solely from fibers that are ejected and layered, or may as necessary include a water-soluble adhesive such as PVA or a rubber (adhesive) such as polyurethane rubber. It is preferable to impregnate the fiber layer 23 with the adhesive during and after creation of the fiber layer 23, or to apply the adhesive by spraying or the like. Alternatively, the fiber layer 23 may be impregnated with the adhesive by ejecting the adhesive at the same time when the fibers 23 are ejected by electrospinning. After the fiber layer 23 is layered on the simulated sclera resin layer 22 as shown in FIG. 7A, the simulated eyeball 1D shown in FIG. 7B can be created by forming the conductor layer 3 in the same manner as in the first to third embodiments.

The sclera of the human eyeball includes many collagen fibers. Therefore, during glaucoma surgery, it is necessary to make a thin slice while severing the collagen fibers using a surgical knife. However, many commercially available simulated eyeballs are formed from a soft rubber such as silicone rubber. Therefore, although it is possible to perform training that involves thin slicing using a surgical knife even when a simulated eyeball created from silicone rubber or the like is used, it is not possible to reproduce a sensation of severing fibers using the surgical knife. However, the simulated sclera 2 of the simulated eyeball 1D of the fourth embodiment includes fibers. Therefore, when the simulated eyeball 1D is used in thin slicing by a surgical knife, it is possible to obtain a sensation imitating that when severing fibers in a human sclera.

(Modification 1 of Fourth Embodiment)

Figure 9:
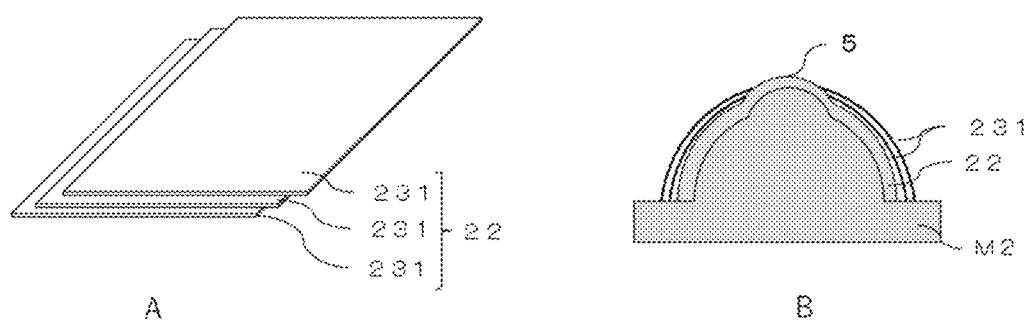
FIGS. 9A and 9B are cross-sectional views showing schematics of a simulated eyeball 1D of modification 1 of the fourth embodiment.

The fiber layer 23 of the simulated eyeball 1D of the fourth embodiment is formed directly on the simulated sclera resin layer 22 by electrospinning, as shown in FIG. 8. However, the fiber layer 23 may be manufactured by other methods as long as the fiber layer 23 includes fibers. For example, the fiber layer 23 may be created by layering a plurality of cloths 231 as shown in FIG. 9A, the cloths 231 being created from fibers that have a diameter of 50-500 nm and are manufactured by electrospinning or another such means, and impregnating the cloths 231 with a water-soluble adhesive exemplified above. The cloths may be such that the fibers are interwoven, or may be non-woven cloths in which the fibers are not interwoven. The simulated sclera 2 shown in FIG. 7A can be created by creating the fiber layer 23 of modification 1 of the fourth embodiment using molds to achieve a shape that can be layered on the simulated sclera resin layer 22, and covering the separately created simulated sclera resin layer 22 with the fiber layer 23. Alternatively, as shown in FIG. 9B, the simulated sclera 2 shown in FIG. 7A can be created by first forming the simulated sclera resin layer 22 using molds, then removing an upper mold (not shown), subsequently layering the cloths 231 on the simulated sclera resin layer 22, performing impregnation with the water-soluble adhesive, and applying pressure through use of the upper mold (not shown) and the mold M2.

Fifth Embodiment

Figure 10A:
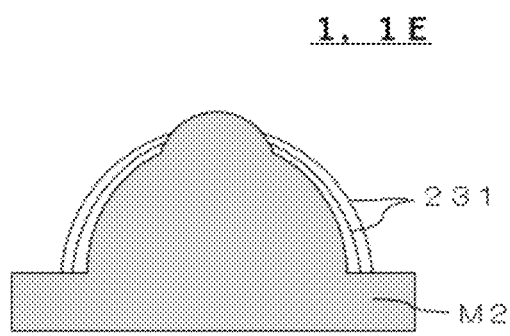
FIGS. 10A and 10B are cross-sectional diagrams showing schematics of a simulated eyeball 1E of a fifth embodiment.
Figure 10B:
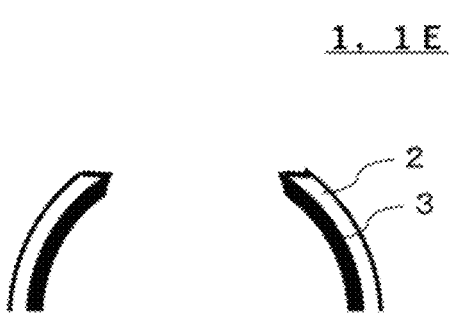

In the embodiment in FIG. 4 and modification 1, the fiber layer 23 is formed on the simulated sclera resin layer 22, but the simulated sclera 2 may instead be formed from only a fiber layer without providing the simulated sclera resin layer 22. FIGS. 10A and 10B are cross-sectional diagrams showing schematics of a simulated eyeball 1E of a fifth embodiment. In the simulated eyeball 1E of the fifth embodiment, a simulated sclera 2 in which cloths are layered is created by first layering a plurality of cloths 231 on the mold M2 as shown in FIG. 10A, then performing impregnation with a water-soluble adhesive, and applying pressure using the mold M2 and an upper mold (not shown). Subsequently forming the conductor layer 3 on the inner side of the simulated sclera 2 makes it possible to create the simulated eyeball 1E of the fifth embodiment. No simulated cornea region is formed in the simulated eyeball 1E shown in FIG. 10B. A simulated cornea region is unnecessary in the case of a sole use involving only training in obtaining thin slices of the simulated sclera 2. Alternatively, the simulated cornea region may be created in the same manner as the simulated sclera 2, and the uses may involve performing training in obtaining thin slices of only the simulated sclera region 2. As another alternative, the simulated cornea region may be created separately and may be bonded to the simulated sclera 2 shown in FIG. 10B using an adhesive or the like.

Sixth Embodiment

As described above, the simulated eyeball 1D of the fourth embodiment and modification 1 and the simulated eyeball 1E of the fifth embodiment are novel simulated eyeballs with which is obtained the sensation of severing fibers of the sclera. The conductor layer 3 is formed in the simulated eyeball 1D and the simulated eyeball 1E for this purpose, but it is also permissible not to form the conductor layer 3. Specifically, in the case of a training application designed to provide the sensation of severing the collagen fibers of a human sclera, the simulated eyeball shown in FIG. 7A in which no conductor layer 3 is formed may be employed as a simulated eyeball 1D' in a sixth embodiment. Similarly, a simulated eyeball in which the conductor layer 3 of the simulated eyeball 1E shown in FIG. 10B is not formed may be employed as a simulated eyeball 1E' in the sixth embodiment.

Seventh Embodiment

Figure 11:
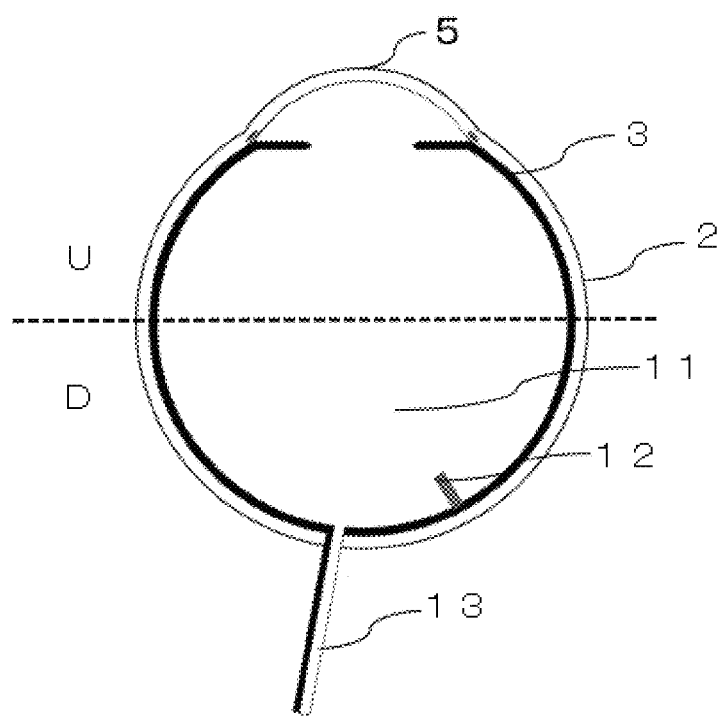
FIG. 11 is a cross-sectional diagram showing a schematic of a simulated eyeball 1F of a seventh embodiment.

FIG. 11 is a cross-sectional diagram showing a schematic of a simulated eyeball 1F of a seventh embodiment. Because much glaucoma is induced by increased internal pressure (20 mmHg or more) in an eyeball, it is necessary to return the eyeball to a normal intraocular pressure (about 11 mmHg) after surgery is complete. Therefore, there is demand for monitoring intraocular pressure before, during, and after surgery. However, in currently available simulated eyeballs for training, no system for measuring such pressure is known.

The simulated eyeball 1F of the seventh embodiment is intended to solve the abovementioned problem. An interior of the simulated eyeball 1F is formed in a hollow sealed shape, and a hollow portion 11 can be filled with a fluid. The simulated eyeball 1F includes a pressure sensor 12 that detects a pressure of the fluid that fills the hollow portion 11. The pressure sensor 12 may be disposed inside the simulated eyeball 1F as shown in FIG. 11. Alternatively, a tube 13 that connects to the simulated eyeball 1F in a sealed state may be provided, and the pressure sensor 12 may be provided at a location where the tube is interposed, i.e., outside of the simulated eyeball 1F. Examples of the fluid include liquids such as water, and gasses such as air. In the present description, the "sealed state" refers to a state where the fluid that fills the simulated eyeball 1F does not leak outside of the simulated eyeball 1F, or a state that is sealed insofar as, due to the simulated eyeball 1F being continuously filled with the fluid, a pressure of about 10-30 mmHg can be maintained even if some of the fluid leaks outside of the simulated eyeball 1F.

The simulated eyeball 1F of the seventh embodiment can be created by: creating a mold for shaping the simulated sclera 2 and the simulated cornea 5, and a mold for shaping the conductor layer (simulated choroid) 3, using a 3D printer or the like; creating the simulated sclera 2, the simulated cornea 5, and the conductor layer (simulated choroid) 3; and then bonding the conductor layer (simulated choroid) 3 to the inner side of the simulated sclera 2. The simulated eyeball 1F must be created in an air-tightly sealed manner so that the fluid does not leak out. Therefore, the simulated eyeball 1F can be created by separately creating an upper part U and a lower part D, as indicated by a dotted line in FIG. 11, and bonding the upper part U and the lower part D. The simulated eyeball 1F preferably has a substantially spherical shape, but shapes other than substantially spherical may be employed as long as the sealed state can be achieved.

The simulated eyeball 1F is not particularly limited as long as the simulated eyeball 1F is formed so that the fluid can be sent into the hollow portion 11. Examples of methods for sending the fluid into the simulated eyeball 1F include using the tube 13 that is for disposing the pressure sensor on the outside to send in the fluid, and providing a tube separate from the tube 13 to send in the fluid. Alternatively, when a viscous liquid is used as the fluid filling the hollow portion 11, the simulated eyeball 1F may be formed in a substantially liquid-tight manner except for formation of very small holes through which air can pass but the viscous fluid cannot pass, and the liquid may be injected into the simulated eyeball 1F using a syringe or the like. Using the simulated eyeball 1F of the seventh embodiment makes it possible to reproduce a pressure similar to the actual intraocular pressure of a glaucoma patient.

The pressure sensor 12 is not particularly limited as long as a pressure in the simulated eyeball 1F can be measured. A commercially available pressure sensor is preferably used. When the simulated eyeball 1F shown in FIG. 11 is used in thinly slicing the simulated sclera 2, the pressure in the simulated eyeball 1F will decrease if the surgical knife penetrates through the simulated sclera 2. The conductor layer 3 is formed in the simulated eyeball 1F of the embodiment shown in FIG. 11 for this purpose, but it is also permissible not to form the conductor layer 3.

The simulated eyeballs according to the first to seventh embodiments and the modification were described above, but the embodiments presented in the description and the drawings are merely representative descriptions of the embodiments. Therefore, a simulated eyeball may be created through a combination of technical features described in the embodiments. For example, in all of the embodiments, the recess 21 may be formed or not be formed, the simulated sclera 2 may include or exclude the fiber layer, and the extension region 31 may be formed or not be formed on the conductor layer 3.

Figure 12:
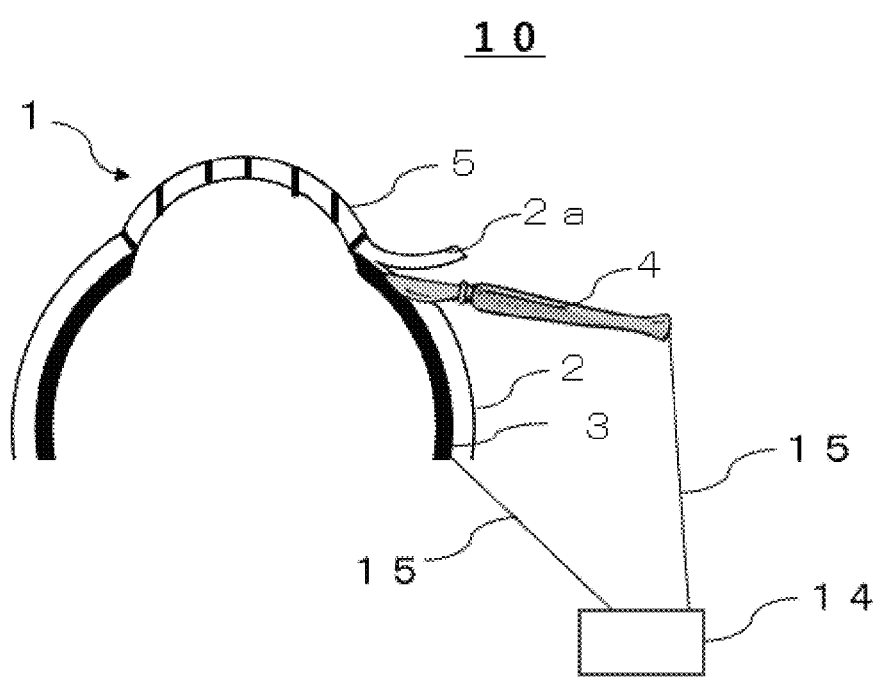
FIG. 12 is a schematic diagram showing a device 10 for training in ophthalmic surgery.

FIG. 12 is a schematic diagram showing a device 10 for training in ophthalmic surgery. The device 10 for training in ophthalmic surgery includes at least a simulated eyeball 1 in which the conductor layer 3 is formed, an ophthalmic surgery instrument 4 in which at least a tip part is formed from an electroconductive material, and a sensing device 14 for sensing that the tip part of the ophthalmic surgery instrument 4 has come into contact with the conductor layer 3 of the simulated eyeball 1. It is preferable to connect the ophthalmic surgery instrument 4 and the sensing device 14, and to connect the conductor layer 3 and the sensing device 14, with wires 15 so that a circuit can be formed when the tip part of the ophthalmic surgery instrument 4 touches the conductor layer 3. The sensing device 14 is not particularly limited as long as it is possible to sense that electricity has been conducted. A well-known device for sensing electrical conduction, such as a tester, is preferably used. In addition, the ophthalmic surgery instrument 4 is not particularly limited as long as the instrument can be used in ophthalmic surgery. Examples include surgical knives in which at least an edge portion is formed from an electroconductive material. Examples of ophthalmic surgery instruments 4 other than surgical knives include punches that are used to fenestrate the sclera, pincettes that grip the sclera that has been thinly sliced by a surgical knife, and metal rods that are inserted into Schlemm's canal. Forming the tip part of any ophthalmic surgery instrument 4 from an electroconductive material makes it possible to sense, inter alia, that the ophthalmic surgery instrument 4 has come into contact with the simulated choroid region 3 during making of an incision in the simulated sclera, or that the metal rod has come into contact with the simulated iris region 31 upon insertion into the simulated Schlemm's canal 21. The simulated eyeball 1 shown in the embodiments is a novel simulated eyeball in which the simulated choroid region 3 and/or the simulated iris region 31 is formed from an electroconductive layer. As described above, the simulated eyeball 1 shown in the embodiments is particularly useful in glaucoma surgery, but can also be used in applications for training in skills required for ophthalmic surgery. For example, an application is also possible that involves training in which an ophthalmic surgery instrument such as a needle is inserted into the eyeball from the cornea without the tip of the needle touching the iris and/or the choroid. Specifically, the simulated eyeball, the device for training in ophthalmic surgery, and the method for training in ophthalmic surgery disclosed in the present description are not limited to glaucoma surgery.

Figure 13:
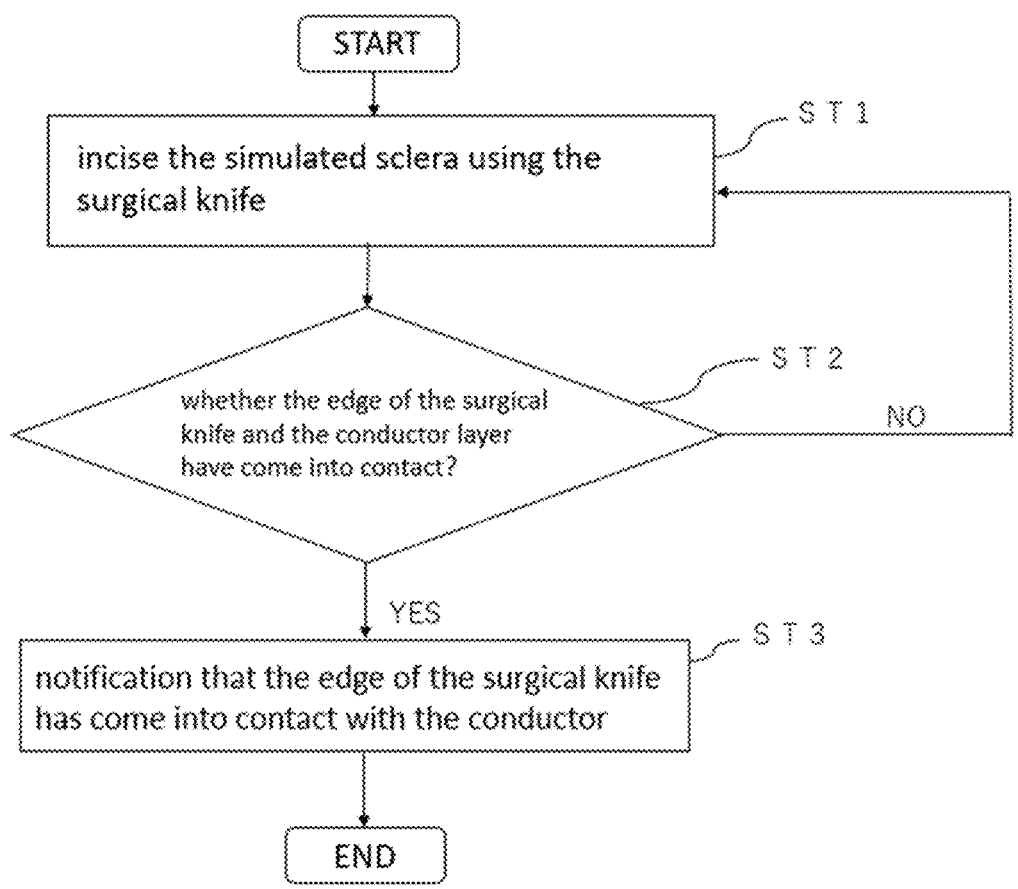
FIG. 13 is a flow chart showing a method for training in ophthalmic surgery.

FIG. 13 is a flow chart showing a method for training in ophthalmic surgery. This training method includes at least an incision step (ST1) in which an incision is made in the simulated sclera using the surgical knife, and a sensing step (ST2) for sensing whether the edge of the surgical knife and the conductor layer have come into contact during the incision step.

When the edge of the surgical knife has not come into contact with the conductor layer in ST2, sensing of whether the edge of the surgical knife has come into contact with the conductor layer is continued uninterrupted (NO). However, in the case of YES in ST2, a change will be observed in a meter or the like of the sensing device such as a tester, therefore making it possible to confirm that electricity has been conducted. As necessary, it is also possible to include a notification step (ST3) in which, when the edge of the surgical knife has come into contact with the conductor layer, a notification that electricity has been conducted is issued, such as by generation of an alarm sound. Even when an ophthalmic surgery instrument other than the surgical knife is used, it is preferable to sense whether the tip portion has come into contact with the conductor layer in a step similar to that for the surgical knife.

Examples are given below to specifically describe the embodiments. The examples are provided merely as references for specific aspects. These examples neither restrict nor limit a scope of the invention.

EXAMPLES

Example 1

(Creation of Simulated Eyeball)

First, molds having the shapes of M1 in FIG. 3A and M2 in FIG. 4B were created using a 3D printer. A simulated cornea region and a simulated sclera region were then created by pouring a 10% PDMS solution (1 g of a curing agent for 10 g of main ingredient Silpot 184 manufactured by Dow Corning Corp.) into a space between the molds and curing the PDMS solution.

Figure 14A:
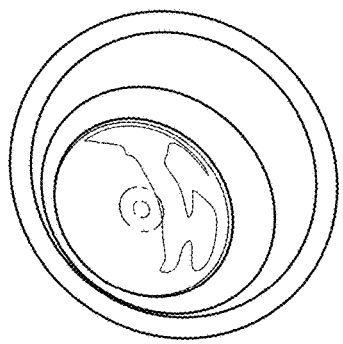
FIGS. 14A and 14B are photographs in lieu of diagrams, where

A conductor layer was then formed by applying a 70% aqueous solution of Denatron (manufactured by Nagase ChemteX Corp.), which is an electroconductive polymer, on an inner side of the simulated sclera region that was created and drying the solution, creating a simulated eyeball of example 1. FIG. 14A is a photograph of the simulated eyeball created in example 1.

Example 2

(Creation of Device for Training in Ophthalmic Surgery, and Conduction Test)

A crescent knife manufactured by Inami & Co., Ltd. was used as a surgical knife, and an Arduino UNO manufactured by Arduino was used as a sensing device. The sensing device and the conductor layer of the simulated eyeball created in example 1, and the sensing device and the surgical knife, were then connected by wires to create a device for training in ophthalmic surgery.

Figure 14B:
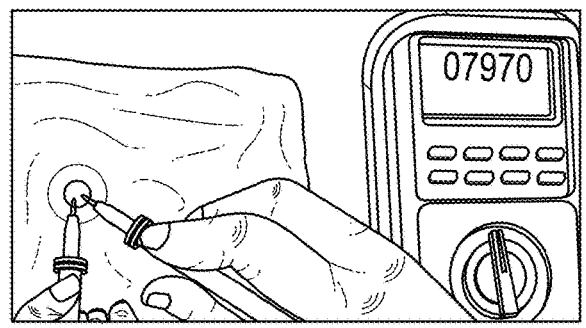

An incision was then made in the simulated sclera until an edge of the surgical knife reached the conductor layer, whereupon the sensing device confirmed that electricity was conducted. FIG. 14B is a photograph of the device for training in ophthalmic surgery when conduction has been confirmed.

According to results from the above, it was confirmed to be possible to sense whether the surgical knife had penetrated through the simulated sclera during training in thinly slicing the simulated sclera, through use of the simulated eyeball in which the conductor layer was formed and the device for training in ophthalmic surgery in which the simulated eyeball was used.

Example 3

(Creation of Simulated Eyeball Including Fiber Layer)

First, molds having the shapes of M1 and M2 in FIG. 3A were created using a 3D printer. A simulated cornea region and a simulated sclera resin layer were then created by pouring a 10% PDMS solution into a space between the molds and curing the PDMS solution.

The mold M1 was then removed, and a rod for rotation was mounted on a bottom part of the mold M2. A nanofiber electrospinning unit device manufactured by Kato Tech Co., Ltd. was used in creating a fiber layer by electrospinning. An 11% by weight vinyl chloride solution was used as a material forming the fiber layer. A mixed liquid obtained by mixing tetrahydrofuran (THF) and N,N-dimethylformamide (DMF) at a ratio of 1:1 was used as a solvent.

Figure 15A:
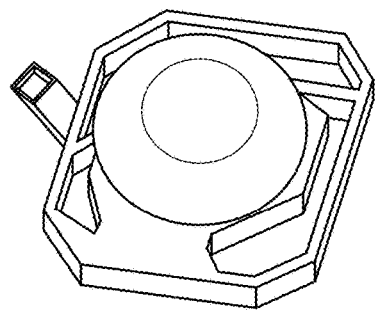
FIGS. 15A to 15C are photographs in lieu of diagrams, where
Figure 15B:
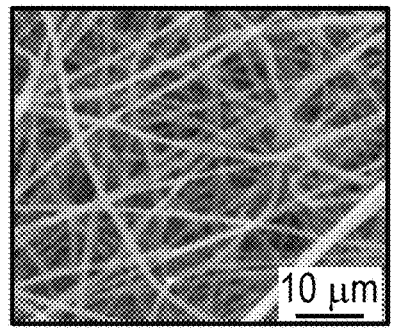

The simulated eyeball was then created by layering fibers on the simulated cornea region and the simulated sclera resin layer that were created, the fibers being layered with an applied voltage of 18 kV and at a supply rate of 0.1 mm/min. When the fiber layer was created by electrospinning, the fiber layer was impregnated with an 8% by weight polyvinyl alcohol solution (adhesive) by the simultaneous ejection of the adhesive. FIG. 15A is a photograph of the simulated eyeball created in example 3, and FIG. 15B is a SEM photograph of the fiber layer. A diameter of the fibers was about 150 nm on average.

Figure 15C:
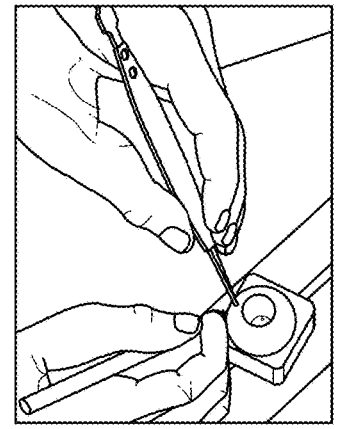

The simulated eyeball created in example 3 was then thinly sliced using the surgical knife. FIG. 15C is a photograph when the simulated sclera (fiber layer) has been thinly sliced. As shall be apparent from FIG. 15C, it was confirmed to be possible to thinly slice and peel away the simulated sclera (fiber layer) of the simulated eyeball created in example 3. It was also confirmed to be possible to reproduce a sensation of severing fibers when severing the fiber layer using the surgical knife.

Example 4

(Creation of Simulated Eyeball Including Pressure Sensor)

First, molds for forming an upper part U and a lower part D of a simulated eyeball 1F shown in FIG. 11 were created, and each of the upper part U and the lower part D were created using a procedure similar to that in example 1. The simulated eyeball 1F having a liquid-tight structure was then created by bonding the upper part U and the lower part D using PDMS.

Two hypodermic needles were inserted into the simulated eyeball 1F, water was injected from one of the needles, and the simulated eyeball 1F was filled with water. At this time, because minute amounts of air and water leaked from the hypodermic needles, an intraocular pressure was raised by continuing to cause water to flow in. An air-tightly sealed pressure sensor (board mount pressure sensor manufactured by Honeywell Inc.) was mounted on the other hypodermic needle, and the intraocular pressure of the simulated eyeball 1F was monitored. Pressure data from the pressure sensor was read by an Arduino Nano manufactured by Arduino, and the ocular pressure of the simulated eyeball 1F was controlled by stopping the inflow of water into the simulated eyeball 1F when a fixed pressure was exceeded and allowing the inflow of water when the pressure decreased.

Figure 16A:
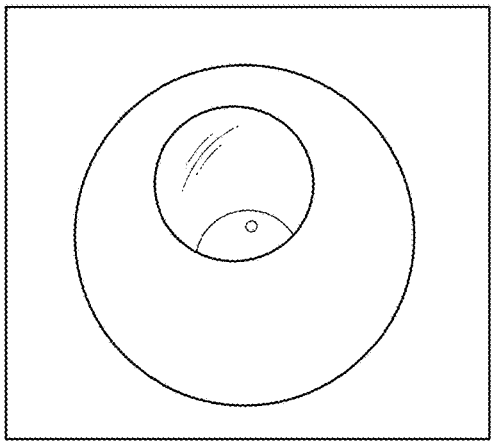
FIGS. 16A and 16B are photographs in lieu of diagrams, where
Figure 16B:
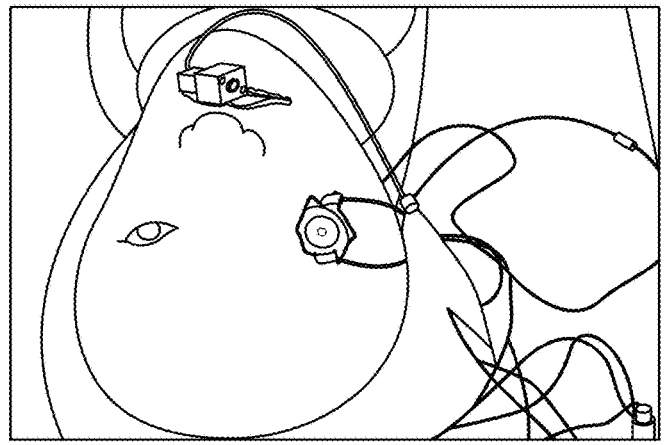
Figure 17:
FIG. 17 shows a transition of pressure inside the simulated eyeball, displayed on a monitor in example 5.

FIG. 16A is a photograph of a simulated eyeball 1F created in example 5. FIG. 16B is a photograph after the simulated eyeball 1F has been filled with pure water using a pump. FIG. 17 represents results showing a transition of pressure inside the simulated eyeball 1F, displayed on a monitor. In FIG. 17, a portion surrounded by a rectangle shows a transition (where time transitions in a direction of a downward arrow) of the pressure of the simulated eyeball 1F. Numeric values in FIG. 17 are results obtained by monitoring at intervals of 1 second. According to these results, it was confirmed to be possible to reproduce the ocular pressure existing during glaucoma surgery by creating the simulated eyeball 1F including the pressure sensor.

In example 5, there was confirmed to be a reduction in pressure in the simulated eyeball when the surgical knife was removed after the edge of the surgical knife penetrated through the simulated sclera 2. Therefore, in the case of the simulated eyeball according to the present embodiment, it was also possible to sense whether the edge of the surgical knife had penetrated through the simulated sclera 2 even when no conductor layer was formed.

The various embodiments disclosed in the present description enable a practitioner to train in surgery on a simulated eyeball using an ophthalmic surgery instrument from outside of the simulated eyeball, the surgery being similar to actual surgery. At such time, when the ophthalmic surgery instrument handled by the practitioner penetrates through a simulated sclera region, a tip part of the ophthalmic surgery instrument, which is formed from an electroconductive material, comes into contact with a conductor layer formed on a side of a simulated sclera region that is on an interior of the simulated eyeball, and electricity is conducted. This makes it possible to sense, inter alia, that the tip part of the ophthalmic surgery instrument has penetrated through the simulated sclera region. Therefore, training in ophthalmic surgery can be performed in an environment that approximates actual surgery. Therefore, the present disclosure in the present description is useful in a field of devices for ophthalmology training.

[Key]
1, 1A, 1B, 1C, 1D, 1D', 1E, 1F simulated eyeball
2 simulated sclera, simulated sclera region
3 conductor layer, simulated choroid region
4 ophthalmic surgery instrument, surgical knife
5 simulated cornea, simulated cornea region
6 resin
11 hollow portion
12 sensor
13 tube
14 sensing device
15 electrical wire
21 recess, simulated Schlemm's canal
22 simulated sclera resin layer
23 fibers, fiber layer
31 extension region of conductor layer, simulated iris region
231 cloth

What is claimed is:

1. A simulated eyeball for training in ophthalmic surgery, the simulated eyeball comprising:
   a simulated sclera region that constitutes a simulated sclera and is formed from a non-electroconductive material; and
   a conductor layer formed on a side of the simulated sclera region that is on an interior of the simulated eyeball, wherein:
   the conductive layer is a metal layer consisting of electroconductive metal material, the conductive layer is an innermost layer of the simulated eyeball and in direct contact with the side of the simulated sclera region, and the conductor layer forms a simulated choroid region.

2. The simulated eyeball of claim 1, wherein:

the simulated eyeball includes a simulated cornea region that constitutes a simulated cornea, the conductor layer includes an extension region that extends away from the simulated sclera into the simulated eyeball, at a position near a boundary between the simulated cornea region and the simulated sclera region, and the extension region forms a simulated iris region.

3. The simulated eyeball of claim 1, wherein:

the simulated eyeball includes a simulated cornea region that constitutes a simulated cornea, a recess is formed on the simulated sclera near the simulated cornea region, the recess being formed on a conductor-layer side of the simulated sclera, and the recess forms a simulated Schlemm's canal.

4. The simulated eyeball of claim 1, wherein:

the simulated sclera includes fibers having a diameter of 50-500 nm.

5. The simulated eyeball of claim 4, wherein the simulated sclera comprises:

a simulated sclera resin layer; and a fiber layer that is layered on the simulated sclera resin layer.

6. The simulated eyeball of claim 4, wherein the simulated sclera comprises:

a cloth formed from the fibers; and a resin with which the cloth is impregnated.

7. The simulated eyeball of claim 4, wherein:

the simulated sclera comprises at least two cloths layered, and each of the at least two cloths is a cloth formed from the fibers and impregnated with a resin.

8. The simulated eyeball of claim 1, wherein:

the interior of the simulated eyeball is formed in a hollow sealed shape to form a hollow portion, and a pressure sensor for detecting a pressure of a fluid when the hollow portion is filled with the fluid is formed inside or outside the simulated eyeball.

9. A device for training in ophthalmic surgery, the device comprising:

the simulated eyeball of claim 1;

an ophthalmic surgery instrument of which at least a tip part is formed from an electroconductive material; and a sensing device for sensing that the tip part of the ophthalmic surgery instrument has come into contact with the conductor layer of the simulated eyeball.

10. A method for training in ophthalmic surgery in which a simulated eyeball and an ophthalmic surgery instrument are used, wherein:

the simulated eyeball comprises:

a simulated sclera region, and a conductor layer formed on a side of the simulated sclera region that is on an interior of the simulated eyeball, the conductive layer is a metal layer consisting of electroconductive metal material, the conductive layer is an innermost layer of the simulated eyeball and in direct contact with the side of the simulated sclera region, a tip part of the ophthalmic surgery instrument is formed from an electroconductive material, and the ophthalmic surgery instrument includes at least a surgical knife;

the training method comprising at least:

an incision step in which an incision is made in a simulated sclera using the surgical knife; and a sensing step for sensing whether an edge of the surgical knife and the conductor layer have come into contact during the incision step.

11. A simulated eyeball for training in ophthalmic surgery, wherein:

the simulated eyeball includes a simulated sclera, and the simulated sclera includes fibers having a diameter of 50-500 nm.

12. The simulated eyeball of claim 11, wherein the simulated sclera comprises:

a resin layer; and a fiber layer that is layered on the resin layer.

13. The simulated sclera of claim 11, wherein the simulated sclera comprises:

a cloth formed from the fibers; and a resin with which the cloth is impregnated.

14. The simulated sclera of claim 11, wherein:

the simulated sclera comprises at least two cloths layered, each of which is a cloth formed from the fibers and impregnated with a resin.

15. A simulated eyeball for training in ophthalmic surgery, wherein:

the simulated eyeball has a simulated sclera region constituting a simulated sclera, and is formed such that an interior of the simulated eyeball has a hollow sealed shape to form a hollow portion, the simulated sclera includes fibers having a diameter of 50-500 nm, and a pressure sensor for detecting a pressure of a fluid when the hollow portion is filled with the fluid is formed inside the simulated eyeball or outside the simulated eyeball.

16. The simulated eyeball of claim 2, wherein:

a recess is formed on the simulated sclera near the simulated cornea region, the recess being formed on the conductor-layer side of the simulated sclera; and the recess forms a simulated Schlemm's canal.

17. The simulated eyeball of claim 2, wherein:

the simulated sclera includes fibers having a diameter of 50-500 nm.

18. The simulated eyeball of claim 3, wherein:

the simulated sclera includes fibers having a diameter of 50-500 nm.

19. The simulated eyeball of claim 17, wherein the simulated sclera comprises:

a simulated sclera resin layer; and a fiber layer that is layered on the simulated sclera resin layer.

20. The simulated eyeball of claim 17, wherein the simulated sclera comprises:

a cloth formed from the fibers; and a resin with which the cloth is impregnated.

* * * * *